(12) United States Patent
Stumer (10) Patent No.: US 6,195,336 B1
(45) Date of Patent: *Feb. 27, 2001

(54) COMPARATIVE PATH REPLACEMENT

(75) Inventor: Peggy M. Stumer, Boca Raton, FL (US)

(73) Assignee: Siemens Information and Communication Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,420

(22) Filed: Apr. 18, 1997

(51) Int. Cl.[7] ...................................................... H04L 1/00
(52) U.S. Cl. ........................... 370/238; 370/248; 370/351
(58) Field of Search ................................... 370/351, 522, 370/357, 259, 260, 401, 241, 247, 245, 248, 250, 251, 252, 238

(56) References Cited

U.S. PATENT DOCUMENTS

| | | | |
|---|---|---|---|
| 4,472,798 | * 9/1984 | Hafer | 370/248 |
| 5,263,025 | * 11/1993 | Torii et al. | 370/468 |
| 5,311,572 | * 5/1994 | Friedes et al. | 379/220 |
| 5,517,550 | * 5/1996 | Kobayashi | 370/328 |
| 5,661,779 | * 8/1997 | Lee | 379/45 |
| 5,751,706 | * 5/1998 | Land et al. | 370/352 |
| 5,884,179 | * 9/1996 | Patel | 455/445 |

\* cited by examiner

Primary Examiner—Hassan Kizou
Assistant Examiner—Daniel Previl (57) ABSTRACT

A method and apparatus for finding a better path through an integrated services digital network (ISDN) involves collecting a first data set about the current path and a second data set about a proposed replacement path. Each gateway or tandem public or private telephone network through which the path travels updates the respective data set with information about its link. The data sets are compared according to preselected criteria. The preferable connection is retained and the less preferable connection is released.

15 Claims, 11 Drawing Sheets

| DATA SET FOR ORIGINAL PATH 202 | DATA SET FOR POTENTIAL PATH 204 |
|---|---|
| 2 <br> 206 | 4 <br> 208 |

FIG. 2A

| DATA SET FOR ORIGINAL PATH 202 | DATA SET FOR POTENTIAL PATH 204 |
|---|---|
| 6 <br> 210 | 0 <br> 212 |

FIG. 2B

| DATA SET FOR ORIGINAL PATH 202 | DATA SET FOR POTENTIAL PATH 204 |
|---|---|
| 3 <br> 214 | 3 <br> 216 |

REQUESTER COMPARES FIRST
AND SECOND DATA BUFFERS
310

PRESELECTED BOOLEAN OR
ARITHMETIC COMBINATIONS
ARE USED FOR COMPARISON
310A

COMPARATIVE PATH REPLACEMENT

TECHNICAL FIELD OF THE INVENTION

The present invention relates to improving the efficiency of paths used in ISDNs (Integrated Services Digital Networks).

BACKGROUND OF THE INVENTION

In a public or private ISDN network where features such as call transfer and call redirection ("call forwarding") may occur, highly inefficient connections may result. For example, suppose a person in San Francisco calls a person in New York who subsequently transfers the call to a person in Los Angeles. The resulting connection will traverse the continent twice and be more than 6,000 miles long, even though the parties actually in the call are only a few hundred miles apart. In such an environment, it may be advantageous for the network to automatically improve (e.g., shorten) the connection between the parties by selecting a new path through the network and by switching to the new path through the network even as the parties continue talking.

This process is known as path replacement. The protocol and procedure for path replacement have been standardized by ISDN standards bodies. However, in current networks, when a path is replaced, e.g., because of a redirection of a call such as a transfer, there is no guarantee that the replacement path is better than the original one. The path may in fact be worse (e.g., more costly).

What is needed is an ISDN path replacement procedure that is driven by comparisons of path quality.

SUMMARY OF THE INVENTION

A networking procedure collects network statistics pertaining to two paths for a network call and determines the better path through the network for the particular call. The procedure collects network data in a first data set containing first data fields. The first data set relates to the path of the current connection. A second data set is collected about a potential replacement path. The first mad second data sets are compared, and the better of the two paths determined.

The procedure provides a means for determining which path through the network is more desirable. Desirability is determined using a predefined set of prioritized criteria customized by each client network. For example, the administrator can indicate that the delay is more important than the number of gateway PTNs (public or private telephone networks), and that trunk priority level should not be considered in the analysis.

Steps in the procedure include: 1) requesting path replacement, which initiates the procedure; 2) collecting statistical routing data link by link for a current path and a proposed replacement path; 3) comparing paths based on the customized criteria; and 4) retaining the better path and releasing the other path.

1. Requesting path replacement

As discussed supra, standardized protocols exist for requesting path replacement. Triggers for path replacement are defined based on preselected criteria. For example, a change in relative costs of different links can arise at certain times of day; accordingly, particular times may trigger a path replacement request. Calls created by means of supplementary service, as for example by "transfer by join" procedures, can trigger a path replacement request, since such a link will pass through the transferring user's PTN, which might not be the least-cost path.

Termination of an add-on conference can also trigger a path replacement search, because the call will always go through the private telecommunications network/exchange (PTN/X) of the conference bridge. Similarly, a call which has been forwarded by Call Forwarding using Forward Switching, or which has undergone Line Hunting, will be routed through the forwarding PTN/X. Any call routed through a particular PTN/X may not follow the most desirable path.

Many other circumstances can lead to a call being routed in an undesirable path.

These circumstances can be selected to trigger a request for a replacement path. In some cases, a gateway PTN can "invite" a PTN to request a new path.

2. Collecting statistical routing data link by link on a per-call basis

A request typically includes a unique "correlation" number to allow any new connection found to be associated with the old connection. An endpoint sends a message requesting a path replacement, along with a data set to be filled. The collected data about the first path is compared with collected data about a candidate replacement path. The more desirable path is retained and the less desirable path is released.

Each data set comprises evaluations of the same standard criteria. The first data set is transmitted from the requesting PTN (the PTN making the path replacement request) in a facility message to the cooperating PTN. Each intermediate tandem or gateway PTN recognizes the facility message, updates the first data set with its information, and passes the message on toward the cooperating PTN. When the cooperating PTN receives the message, it also updates the first data set. The cooperating and requesting PTNs may additionally function as gateways. When the data collection process cannot be internetworked, the gateway acts on behalf of the user PTN as a requesting PTN and/or cooperating PTN for the collection of the data.

After all the route information has been gathered (e.g., the first data set has arrived at the cooperating PTN and been updated), the first data set is sent from the cooperating PTN back to the requesting PTN within a facility acknowledgment message. In the return direction, the first data set is not updated. In a preferred embodiment, the first data set in the return direction is sent along the original path. In alternative embodiments, the first data set in the return direction could be sent along the candidate replacement path.

The second data set is transmitted along the candidate replacement path to the requesting PTN. Each intermediate PTN updates the data set with its information. The first and second data sets each have unique identifiers.

3. Path analysis based on administrable parameters

In a first embodiment, criteria are compared pairwise. For each criterion selected by the user, either the first data set or the second data set wins (excepting ties). For each data set, the number of wins is counted. The most desirable path (the path that "wins" on the most criteria) is selected. The other path is released.

In a preferred embodiment, each criterion is evaluated at each PTN on a scale of zero to fifteen, with zero being more desirable. In one alternative, the path with the smaller sum wins. In another alternative, the path with the smaller maximum individual criterion score wins.

In a second embodiment, the user selects numerical weights for the criteria. Each criterion is multiplied by its respective numerical weight and these products are summed for each path. The path corresponding to the data set with the smaller sum is selected, and the other path is released.

DETAILED DESCRIPTION OF THE PREFERRED EMBODIMENTS

Figure 1A:
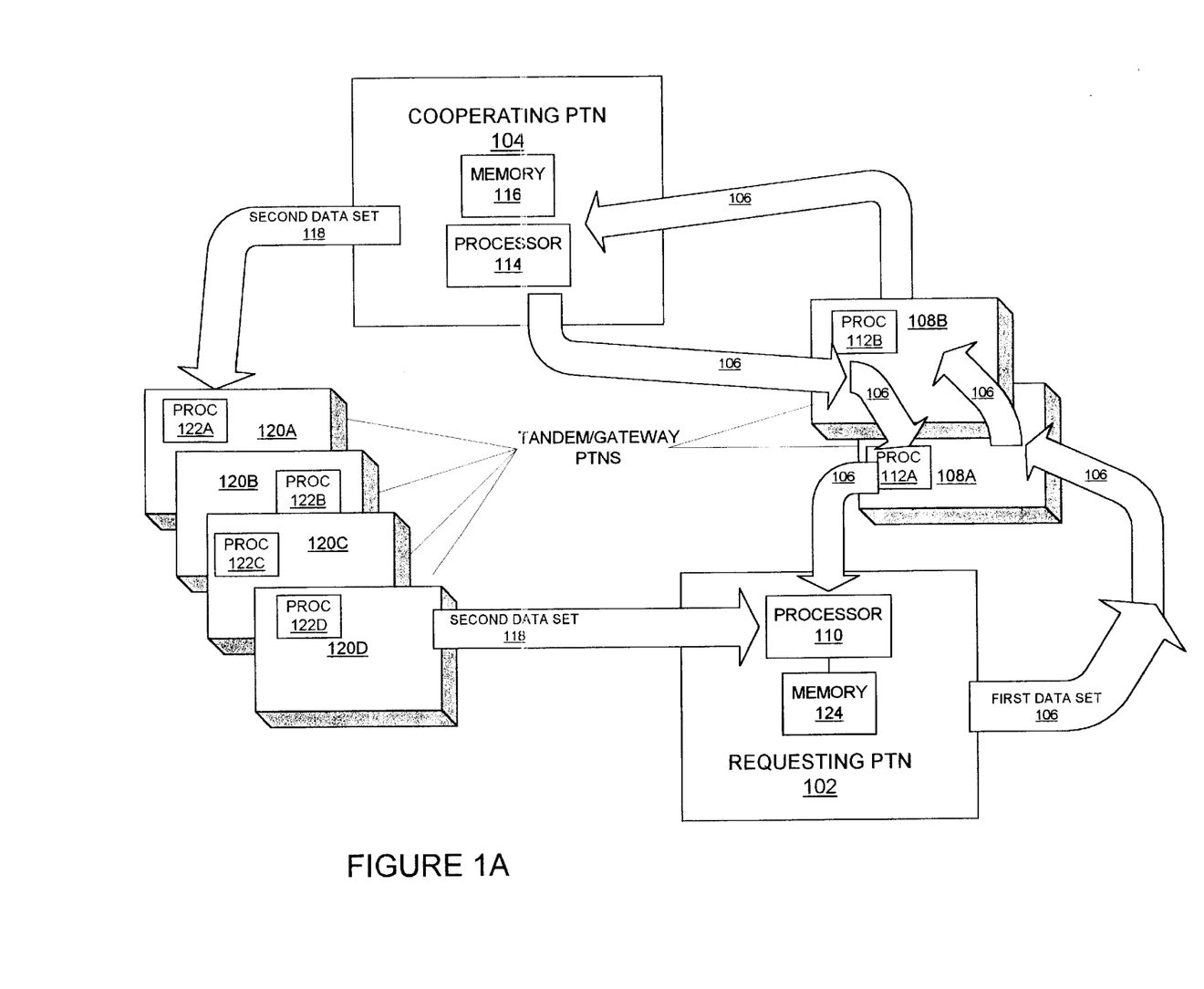
FIG. 1A is a block diagram of a system of the present invention where all hops are terrestrial.

A system for improving call routing through a network (i.e., speech, data, video, 3.1 kHz) is schematically illustrated in FIG. 1A. As shown in FIG. 1A, a requesting public or private telephone network (PTN) 102 sends a request for a new path to a cooperating PTN 104. The request is transmitted to cooperating PTN 104 along the current connection path 106, schematically illustrated in FIG. 1 by arrows. In the illustration of FIG. 1A, the current connection path is between requesting PTN 102 and cooperating PTN 104, via intermediate gateway PTNs 108A and 108B. Requests can be automatically triggered by preselected triggering events, such as a forwarded call, or can be requested during a call, or at a particular time during the life of a call. There is no limit to the number of times this procedure can be performed in a single call.

To begin the request, a processor 110 within requesting PTN 102 initializes the data fields of a first data set within a data buffer. The data fields correspond to path quality criteria of interest. The criteria are selectable. For example, higher-usage trunks may provide more desirable routing paths; if so, the user can select trunk usage as a criterion, and can weight it according to his or her preferences. In a preferred embodiment, data fields include (but are not limited to) the following:

cost of link, a sliding scale value from zero to 15 designating cost for each trunk facility, with lower values more desirable;

priority level, ranging from zero to 15, representing the relative rank of the outgoing trunk in an ordered route element list for a given route, with lower values more desirable;

a terrestrial hop counter, which counts the transit hops involved in the one-way connection; fewer hops is generally more desirable. The number of hops is incremented by one for each gateway PTN in the connection, as well as for the cooperating PTN; and a time stamp; the time stamp is Greenwich Mean Time (GMT), and is provided by the cooperating PTN and intermediate PTNs. The time stamps are used to calculate D-channel end-to-end transit delay. The requesting PTN will provide the data analysis and comparison and determine which path to retain and which to release.

In an alternative in which satellite and/or B-channel delay is taken into account, the following data fields are also included:

a satellite hop counter, which counts the number of satellite transmission stations in the path. The satellite transmission system increments the counter by 1 for each time a signal travels from one satellite earth station to the satellite and to the other satellite earth station; and process delay times, the time it takes for a single station (i.e., terrestrial or satellite) to process the message from incoming time to outgoing time; which can be either a calculated time provided by a system or the difference between outgoing and incoming GMT time stamps.

The request is sent within a facility message ("FAC"). In the example of this embodiment, the request, the first data set, and FAC are transmitted first to a gateway PTN 108A, then to a gateway PTN 108B, and finally to cooperating PTN 104. At gateway PTN 108A, path quality information is entered into the fields of the first data set by a processor 112A within PTN 108A, and the terrestrial hop counter is increased by one. When an intermediate PTN is awarded an outgoing trunk, it collects data including the route element's order on the route table for the trunk awarded for this connection; and the trunk usage level for the trunk used for this connection. Alternatively, the path quality information can be looked up in a data base. For example, a PTN can look up an incoming trunk's cost of link. If information is looked up, processor 112A within PTN 108A accesses a memory (not shown) to retrieve the information.

The request, first data set, and FAC are then sent to a processor 112B within PTN 108B. PTN 108B adds information to the first data set, and increases the terrestrial hop counter by one. The request, incremented and updated first data set, and FAC are then sent to the cooperating PTN.

The request, first data set, and FAC are received by a processor 114 of cooperating PTN 104. Cooperating PTN 104 updates the first data set with its own information. The information can be measured, detected, or looked up, as for example in a data base in a memory 116. In the preferred embodiment, the cooperating PTN looks up the incoming trunk's cost of link in order to update the first data set.

The cooperating PTN then returns the first data set within an acknowledgment message ("ACK") along current path 104, e.g., from cooperating PTN 104 to gateway PTN 108B to gateway PTN 108A, and back to requesting PTN 102. Preferably, the first data set is not updated in its return trip. However, in an alternative embodiment, where the data are likely to have changed, the first data set is updated in a return trip to provide second data points, and appropriate criteria determined by averaging.

Meanwhile, cooperating PTN 104 establishes a candidate replacement path 118 based on criteria in the request for path replacement. Processor 114 of the cooperating PTN initializes a second data set containing the same data fields as the first data set. The second data set is transmitted along a candidate path 118. At each gateway PTN 120A–120D, information about candidate path 118 is added to the second data set via respective processors 122A–122D. (The data set also includes time stamps and a terrestrial hop counter.)

Information about candidate path 118 can be measured, calculated, encoded on equipment, or looked up. Information looked up can be collected statistics, or can be predictions of circumstances, as for example a prediction of increased usage based on time of day. In such a case, data are forecast and accessed from a data base. Each gateway PTN can add a time stamp, allowing the delay to be determined by taking the difference between later stamps and the initial stamp.

Typically, but not necessarily, the cooperating PTN sends but does not receive on the new connection, and sends and receives on the old connection. Cooperating PTN 104 time stamps the first data set in GMT, enabling the requesting PTN to calculate elapsed time.

If candidate path 118 is an improvement over current path 106, the connection over candidate path 118 is maintained and current path 106 is terminated. If candidate path 118 is considered equivalent to current path 106 according to the user's criteria, path 118 is kept and path 106 is released. If path 106 is considered better than candidate path 118 according to the user's criteria, path 106 is retained and path 118 is released.

When needed, switchover from the existing path to the new path is facilitated via a "half-path switchover procedure" to minimize bearer channel interruption. The send and receive paths at each end point PTN are switched over gradually based on the signaling.

Requesting PTN 102 receives the incoming new connection and associates it with an existing connection via its unique correlation number.

Figure 1B:
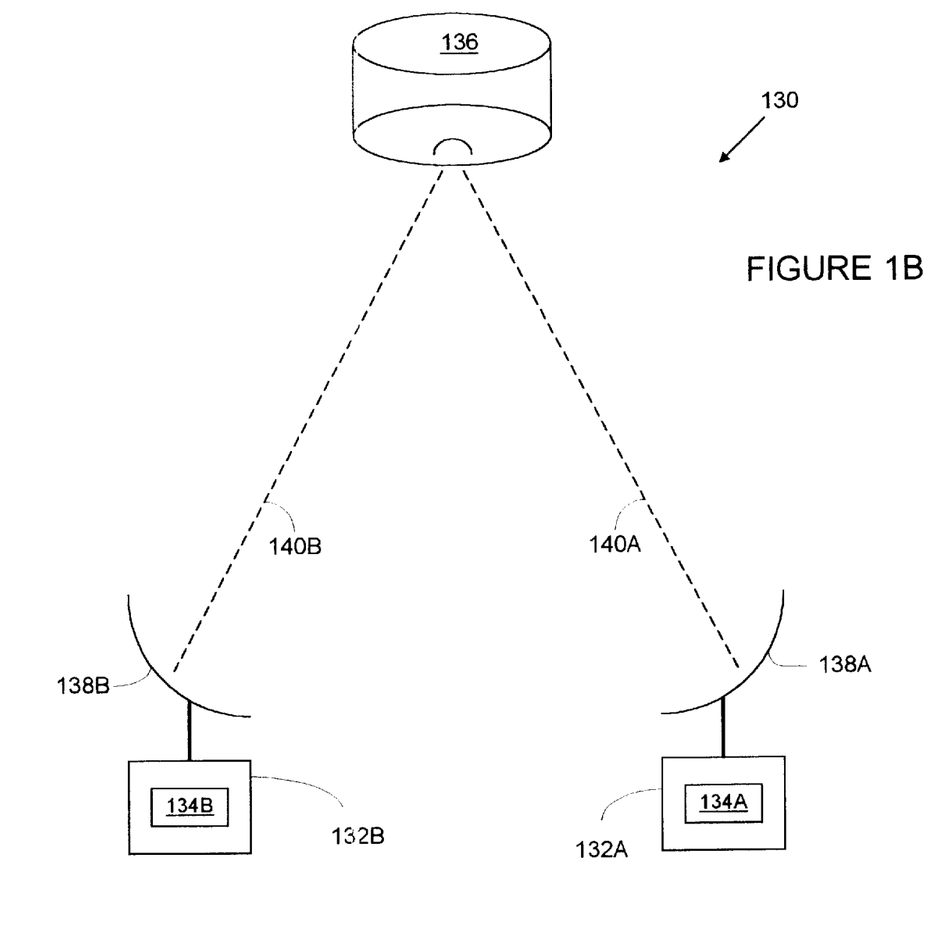
FIG. 1B is a diagram of a satellite system, schematically illustrating two earth stations and a satellite.

FIG. 1B shows a satellite system 130 with two earth stations 132A and 132B (including respective processors 134A and 134B) and a satellite 136. Satellite transmission typically uses radio waves to transmit data. Earth station 132A includes a satellite dish 138A that uplinks data to satellite 136, as schematically shown by dashed-line path 140A. Transponders of satellite 136 repeat the signal to downlink earth station 132B via dish 138B, as indicated by a dashed-line path 140B.

Figure 1C:
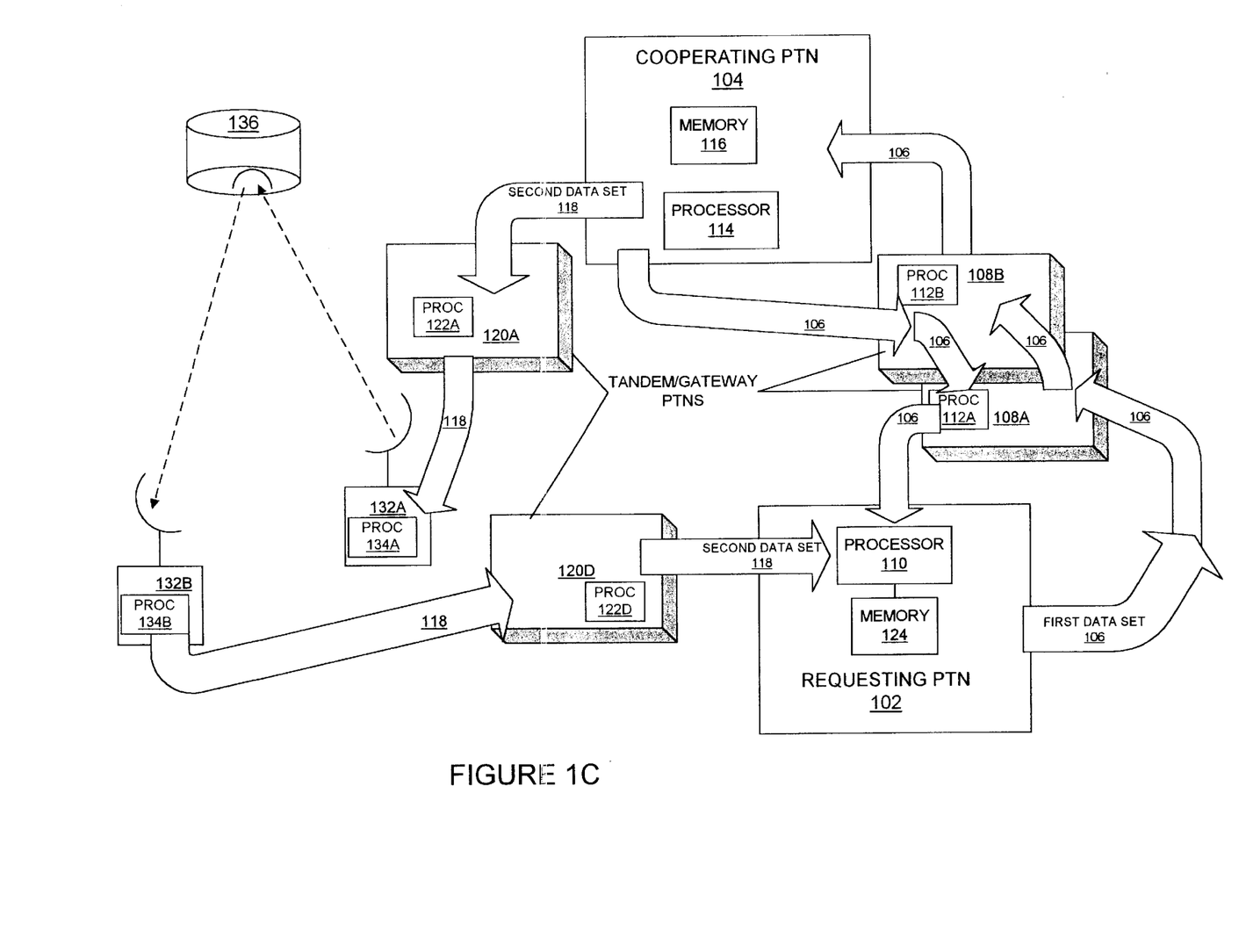
FIG. 1C is a block diagram of a system similar to that of 1A but including satellite hops.

FIG. 1C shows a system similar to that of FIG. 1A but including a satellite hop. As in FIG. 1A, a requesting PTN 102 sends a request for a new path to a cooperating PTN 104. The request is transmitted to cooperating PTN 104 along the current connection path 106, schematically illustrated in FIG. 1C by arrows. In the illustration of FIG. 1C, the current connection path is between requesting PTN 102 and cooperating PTN 104, via PTNs 108A and 108B. The request can be automatically triggered by the same preselected triggering events that would trigger a request in the terrestrial system of FIG. 1A. As shown in FIG. 1C, the candidate replacement path includes satellite earth stations 132A and 132B and satellite 136.

The process delay times to be updated in each data set may be either 1) a time calculated by each gateway system by subtracting the time of message arrival from the time of message departure, allowing the process delay time to be kept as a running total (format mm/ss/ms); or 2) the time of message departure and the time of message arrival.

In this case, the requesting PTN (which includes a comparator) will perform the calculation.

Figure 1D:
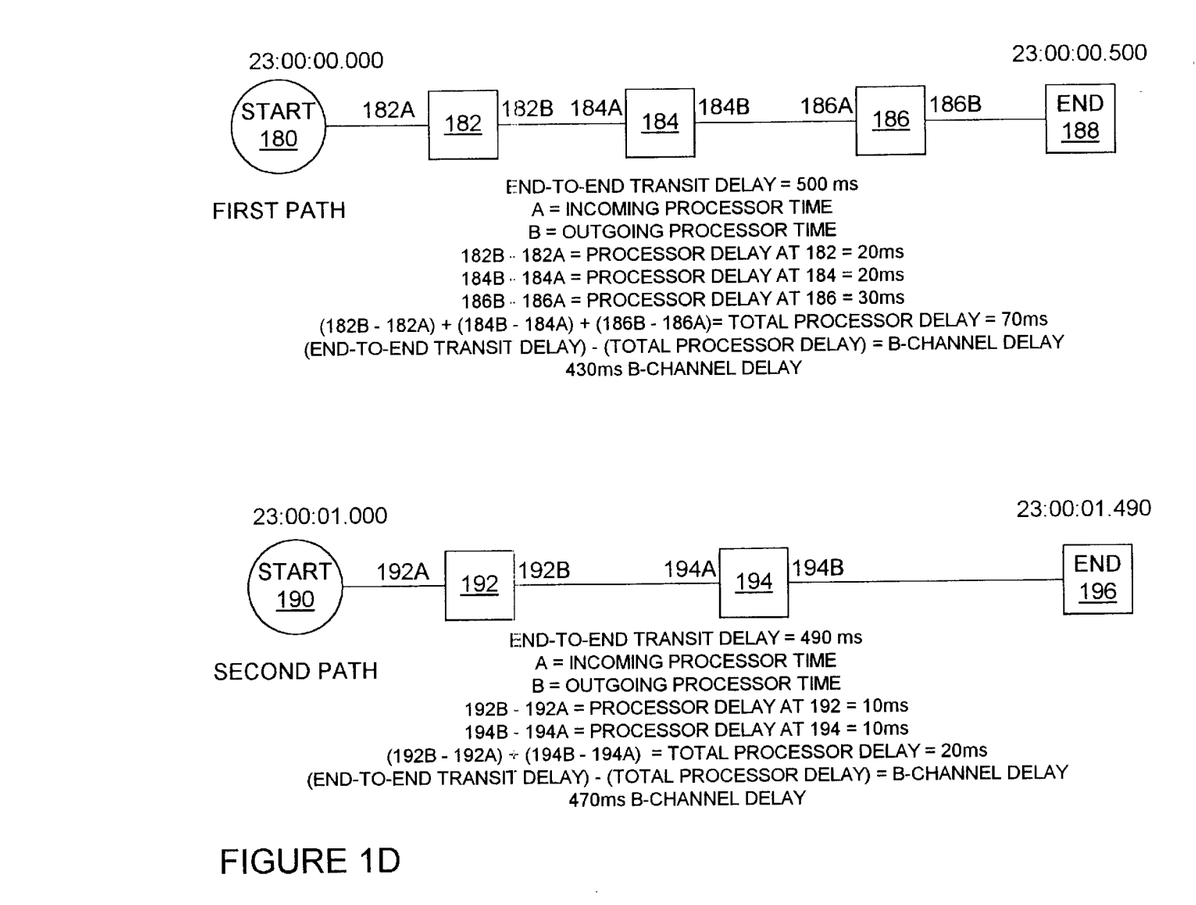
FIG. 1D is a diagram illustrating calculation of path delay including channel delay.

Channel delay can be an important factor in determining the desirability of a path because high channel delay is more of a risk factor for signal deterioration than high processor delay. B-channel delay can be calculated (within a margin of error) making use of the D-channel transit delay calculation. FIG. 1D depicts an example of path comparison using B-channel delay calculation.

FIG. 1D shows a first path and a second path. The first path has a starting point 180, and goes through gateways 182, 184, and 186 before reaching an end point 188. In the example, A=incoming processor time as recorded by a time stamp and B=outgoing processor time as recorded by a time stamp. The difference B−A thus yields the processor delay for each gateway. Accordingly, 182A represents the time as recorded by a time stamp that the signal entered gateway 182 and 182B represents the time as recorded by a time stamp that the signal exited gateway 182. Subtracting 182A from 182B gives the processor delay for gateway 182. In the example of FIG. 1D, the processor delay for 182 is 20 milliseconds (ms). Similarly, 184A represents the time as recorded by a time stamp that the signal entered gateway 184 and 184B represents the time as recorded by a time stamp that the signal exited gateway 184. Subtracting 184A from 184B gives the processor delay for gateway 184, 20 ms in the example. The processor delay for gateway 186 can be similarly obtained, 30 ms in the example of FIG. 1D. Summing the differences B−A for the path yields the total processor delay for the path, 70 ms.

As discussed supra, the end-to-end transit delay for each path is also being measured by use of time stamps. In the example of FIG. 1D, the first path starts at 23:00:00.000 and ends at 23:00:00.500, so the end-to-end path delay for the first path is 500 ms. Subtracting the total processor delay from the end-to-end transit delay yields the B-channel delay. In the example of FIG. 1D, the B-channel delay is 430 ms.

For the second path, the end-to-end delay from a starting point 190 to an end point 196 is 490 ms and total processor delay through gateways 192 and 194 is 20 ms. Accordingly, the B-channel delay for the second path is 470 ms.

For the example shown in FIG. 1D, if only the end-to-end delay is considered, the second path looks more desirable than the first path. However, if B-channel delay is important, the first path is actually more desirable than the second path.

Analysis Procedure

In the preferred embodiment, the analysis procedure in determining the better path is as follows. In general, each of the following criteria is compared path-to-path. For each criterion, the path with the better result (that "wins") is noted. At the end of the comparison, the path with the most "wins" is considered the more desirable path.

1. Total link cost: Compare the total cost of links of the present path with the total cost of links of the candidate replacement path. The path with lower total cost wins.

2. End-to-end transit delay: The time stamp from dispatch of the first data set is subtracted from the time stamp at receipt of the first data set. Then the time stamp from dispatch of the second data set is subtracted from the time stamp at receipt of the second data set. The smaller difference indicates the faster ("winning") path.

3. Number of gateway PTNs: Compare the hop count of the first set with the hop count of the second set. The path with smaller count "wins" because it has fewer intermediate PTNs.

4. Trunk priority: Compare the total of trunk priority data in the first data set with the trunk priority data in the second data set. The path with lower values wins because it uses higher priority trunks.

In embodiments in which B-channel delay and/or satellite hops are considered, one or both of the following criteria are added:

5. Number of satellite hops: Compare the satellite hop counter of the first set with the satellite hop counter of the second set. The path with the smaller count wins because it has fewer satellite hops.

6. B-channel delay derivation: All the process delay times are added together for total process delay. When message arrival times and message departure times are received, each arrival time must be subtracted from the corresponding departure time for process delay time; then the calculated process delay times are all added together for total process delay. The total represents the time all PTN/satellite systems in the connection took in order to process a message. These calculations are done for both the first data set and the second data set. Subtract the first data set's total process delay from the previously calculated first data set's end-to-end transit delay resulting in the B-channel delay derivation. This subtraction is also performed on the second data set. Assumption: Given that both the D-channel and B-channel on a T1 circuit are 64 kbs, then subtracting the total process delay time from the D-channel end-to-end transit delay results in a derived B-channel delay. The path with the smaller result wins.

Which data to apply depends on which elements of the set have been administered as important. Data administered as "not important" will be ignored. If all table elements are "not important", no analysis is required. Where a comparison's result is equal, that criterion is ignored, since it is deemed to be equivalent.

The path comparison is implemented by processor 110 of requesting PTN 102. A method that could be used by processor 11 is illustrated by the following pseudocode (where an index of one indicates the current path and an index of two indicates a candidate replacement path, and DS indicates a data set).

```
If ((cost_of_link == "important") AND (DS1 cost_of_link ≠ DS2 cost_of_link)) then
    {
    perform cost_of_link comparison;
    If (DS1 cost_of_link < DS2 cost_of_link) then
        add one to wins[1] else add one to wins[2];
    }
If ((terrestrial_hop_count == "important") AND (DS1 terrestrial_hop_count ≠ DS2
terrestrial_hop_count)) then
    {
    perform terrestrial_hop_count comparison;
    If (DS1 terrestrial_hop_count < DS2 terrestrial_hop_count) then
        add one to wins[1] else add one to wins[2];
    }
If ((end_to_end_transit_delay == "important") AND (DS1 end_to_end_transit_delay
≠ DS2 end_to_end_transit_delay)) then
    {
    perform end_to_end_transit_delay calculation;
    If (DS1 travel_time < DS2 travel_time) then
        add one to wins[1] else add one to wins[2];
    }
If (trunk_priority == "important") AND (DS1 trunk_priority ≠ DS2 trunk_priority))
then
    {
    perform trunk_priority comparison;
    If (DS1 priority_level < DS2 priority_level) then
        add one to wins[1] else add one to wins[2];
    }
Where B-channel delay and/or satellite hops are to be considered, appropriate
steps can be added to the method, as illustrated by the following pseudocode:
If ((satellite_hop_counter == "important") AND (DS1 satellite_hop_counter ≠ DS2
satellite_hop_counter)) then
    {
    perform satellite_hop_counter comparison;
    If (DS1 satellite_hop_counter < DS2 satellite_hop_counter) then
        add one to wins[1] else add one to wins[2];
    }
If ((B-channel_delay == "important") AND (DS1 B-channel_delay ≠ DS2
B-channel_delay)) then
    {
    perform B-channel_delay calculation;
    If (DS1 B-channel_delay < DS2 B-channel_delay) then
        add one to wins[1] else add one to wins[2];
    }
At the end of the method, the following comparison is implemented:
If(wins[1] > wins[2]) then
    retain original path
    else switch to replacement path;
```

Figure 2A:
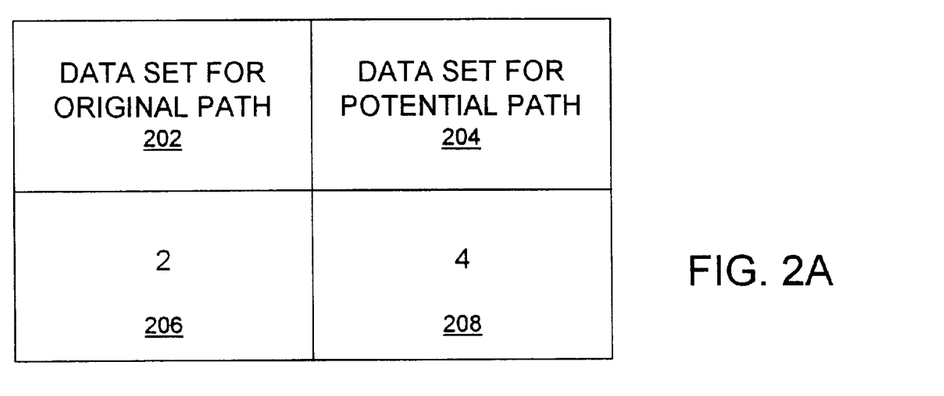
FIGS. 2A, 2B, and 2C depict accumulator tables according to the present invention.
Figure 2B:
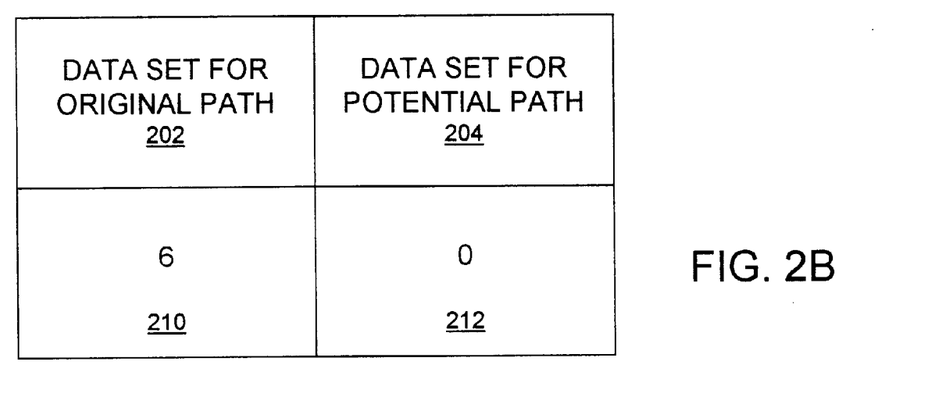
Figure 2C:
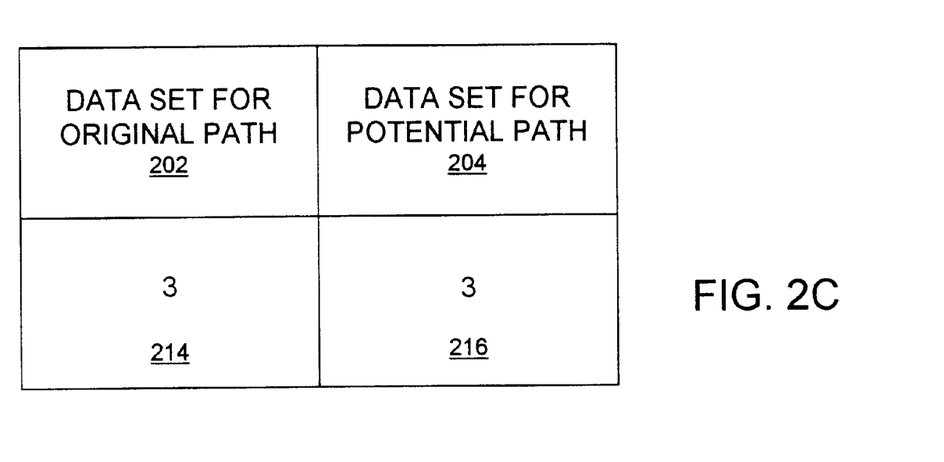

To describe the determination, two accumulators are initialized to zero, one for each path. The wins are then counted for each path. The accumulator with the higher number indicates the path to retain. FIGS. 2A, 2B, and 2C illustrate different outcomes for three different path comparisons, corresponding to three different calls.

Each of FIGS. 2A, 2B, and 2C show accumulator tables indicating the number of wins for each path. Each table includes a heading 202 for the data set of the original path and a heading 204 for the data set of the replacement path. In the first path comparison, illustrated in FIG. 2A, the candidate replacement path, as represented by the second data set, has won on four of the criteria, as indicated by a table entry 208; the original path, as represented by the first data set, has won on only two of the criteria, as indicated by a table entry 206. Accordingly, the call will be switched to the replacement path and the original path will be released.

FIG. 2B illustrates an accumulator table where the original path has won on all six criteria, as indicated by a table entry 210; the candidate replacement path has won on zero, as indicated by a table entry 212. Accordingly, the original path will be retained and the candidate replacement path will be released.

FIG. 2C illustrates an accumulator table where the original path and the candidate replacement path have each won on three criteria, as indicated by a table entry 214 and a table entry 216. Accordingly, the call will be switched to the replacement path and the original path will be released To retain and clear the path, path replacement procedures, as for example those adopted by standards bodies, are used.

In the preferred embodiment, where the paths have an equal number of wins, the replacement path will be retained and the original path released. Alternatively, when the paths have an equal number of wins, the original path can be retained and the replacement path released. This choice can be implementation independent. In the case where a gateway or tandem PTN does not support the path replacement procedure, the request will be passed through transparently. Where fewer criteria are considered, the comparison will account for those criteria only.

Figure 3:
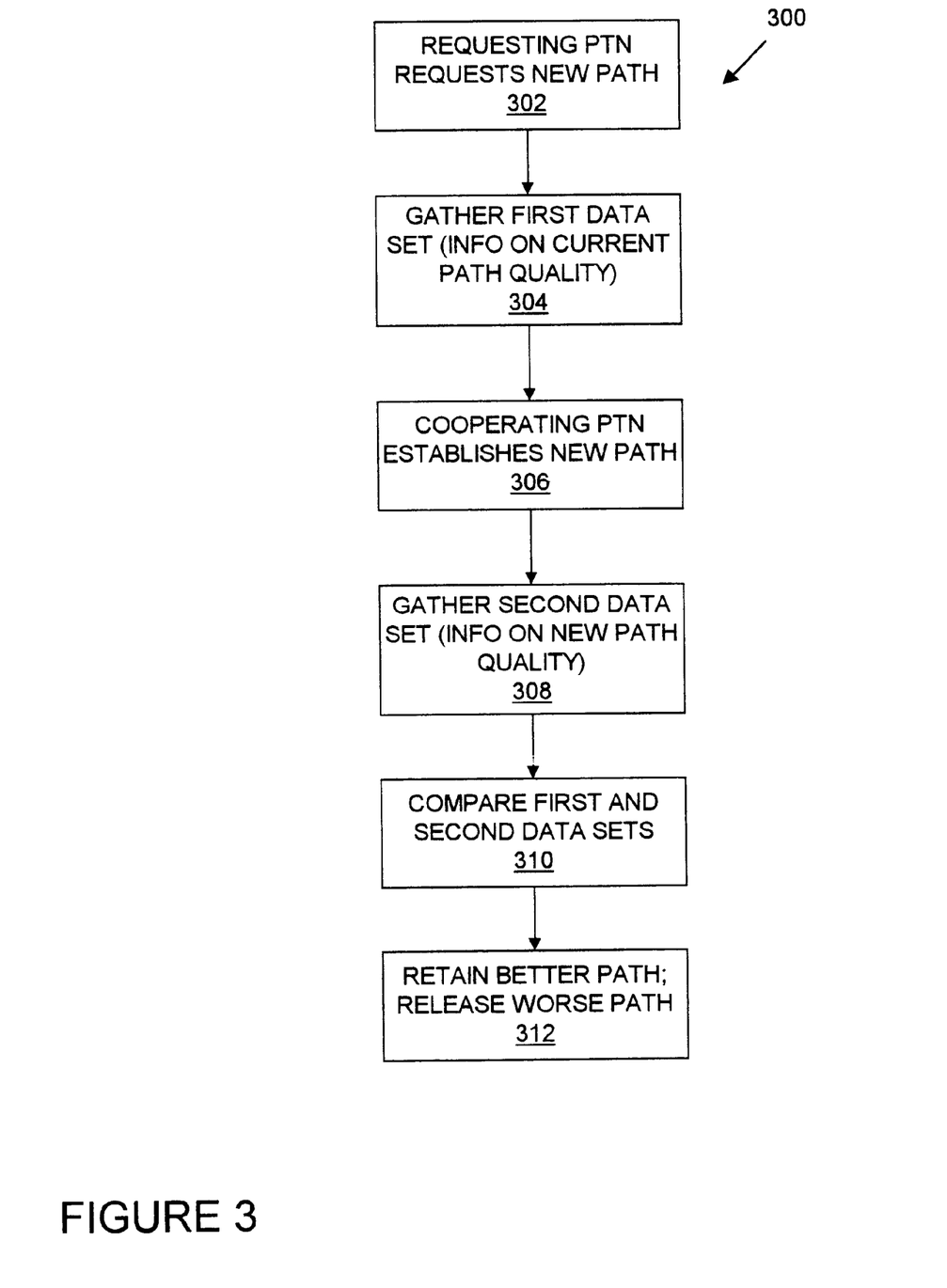
FIG. 3 illustrates a method in accordance with the present invention.

A method 300 in accordance with the present invention is shown in FIG. 3. In method 300, a requesting PTN requests a new path, at a step 302. Information on the current path quality is gathered in a first data set, at a step 304. A cooperating PTN establishes a potential replacement path at a step 306. Information on the potential replacement path is gathered into a second data set, at a step 308.

The first and second data sets are compared, at a step 310. The better path is retained and the worse path released, at a step 312.

Figure 4:
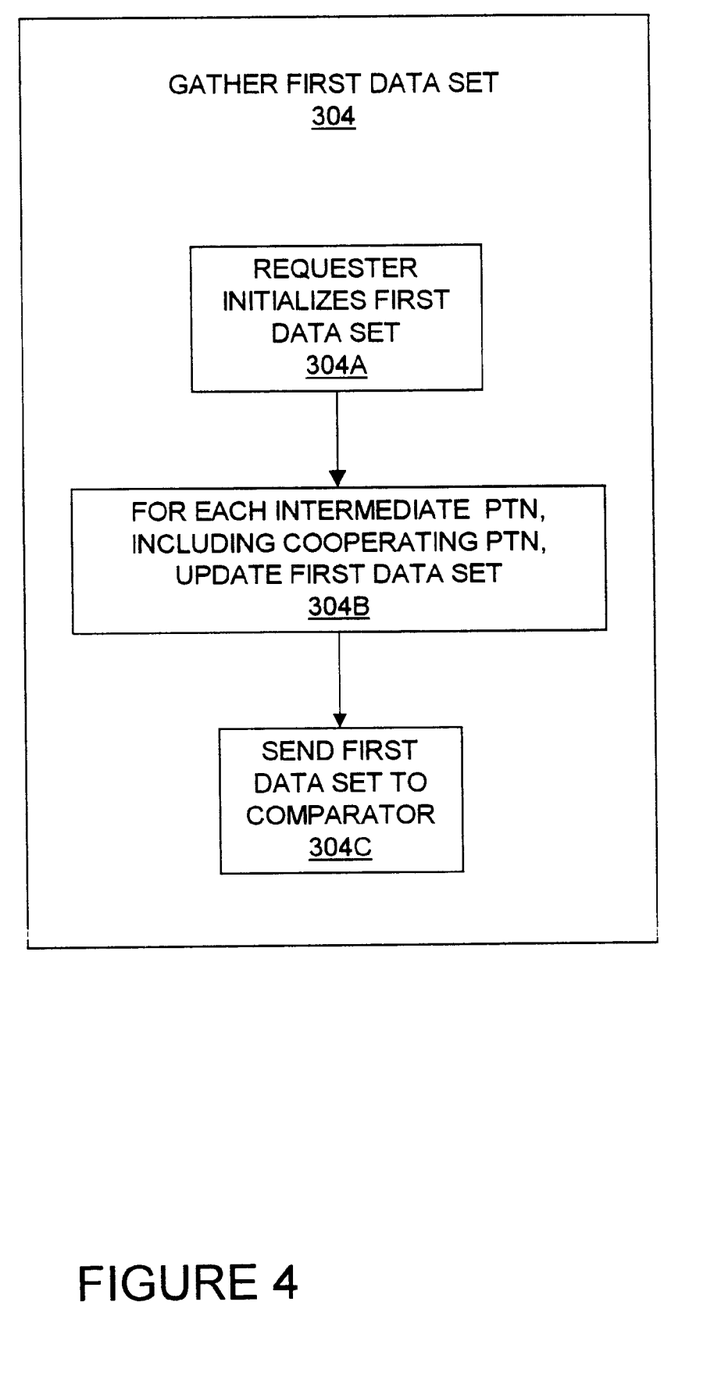
FIG. 4 illustrates substeps of a step of the method of FIG. 3.

The process of gathering the first data set is shown in more detail in FIG. 4. As shown in FIG. 4, the step 304 of gathering a first data set includes the following substeps.

The requester initializes a first data set, at a substep 304A. The first data set is given its identifier and is time stamped GMT to indicate the starting time. At a substep 304B, for each intermediate PTN, including the cooperating PTN, the first data set is updated. The first data set is then sent to the comparator, at a substep 304C. The method then returns to step 306, as shown in FIG. 3, with the cooperating PTN establishing a new path.

Figure 5:
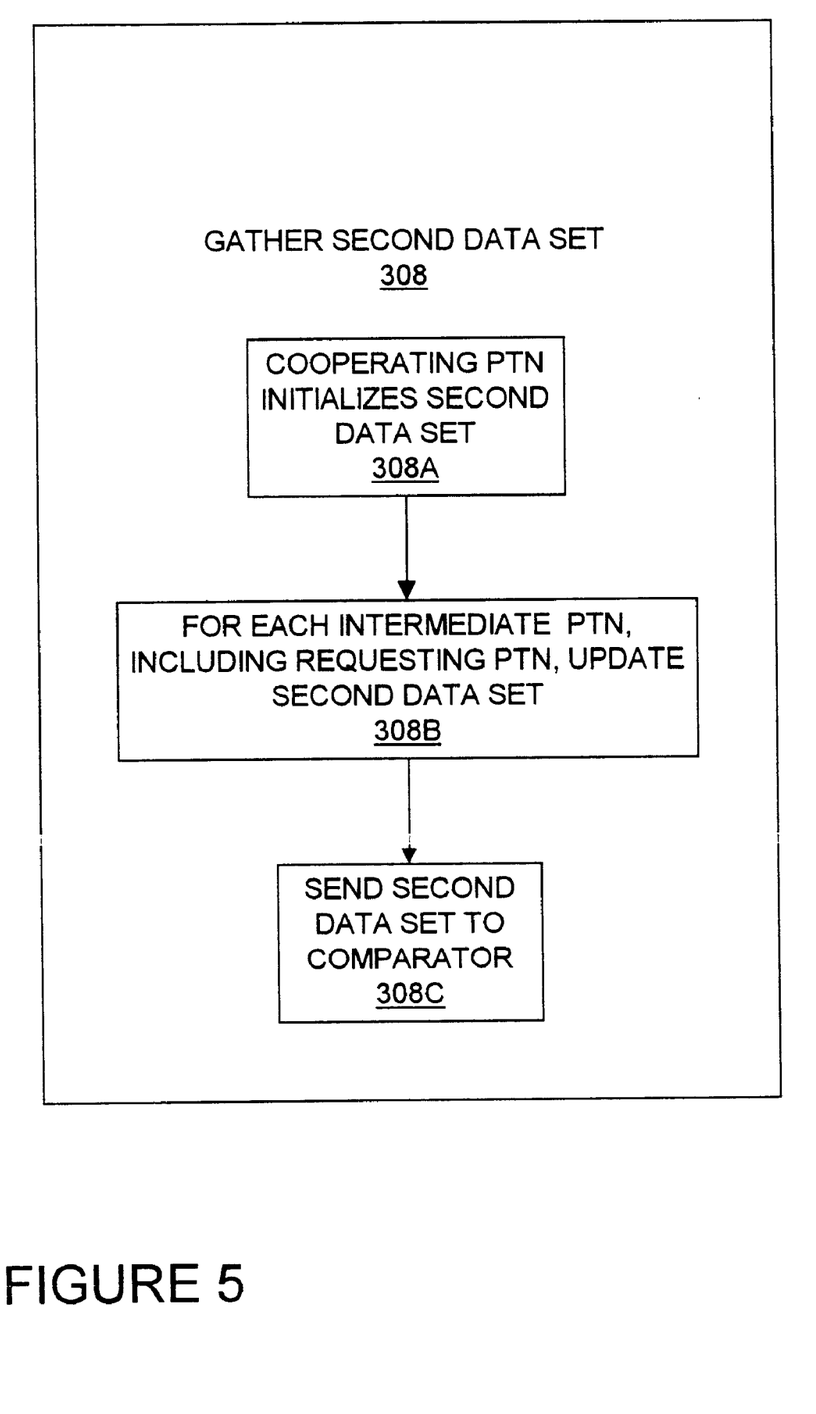
FIG. 5 illustrates substeps of a step of the method of FIG. 3.

The process of gathering the second data set, step 308 in FIG. 3, is shown in more detail in FIG. 5. As shown in FIG. 5, the step 308 of gathering a second data set includes the following substeps. The cooperating PTN initializes a second data set, at a substep 308A. At a substep 308B, for each intermediate PTN between the cooperating PTN and the requesting PTN, the second data set is updated. The requesting PTN also updates the data set. The second data set is sent to a comparator, at a substep 308C.

Figure 6:
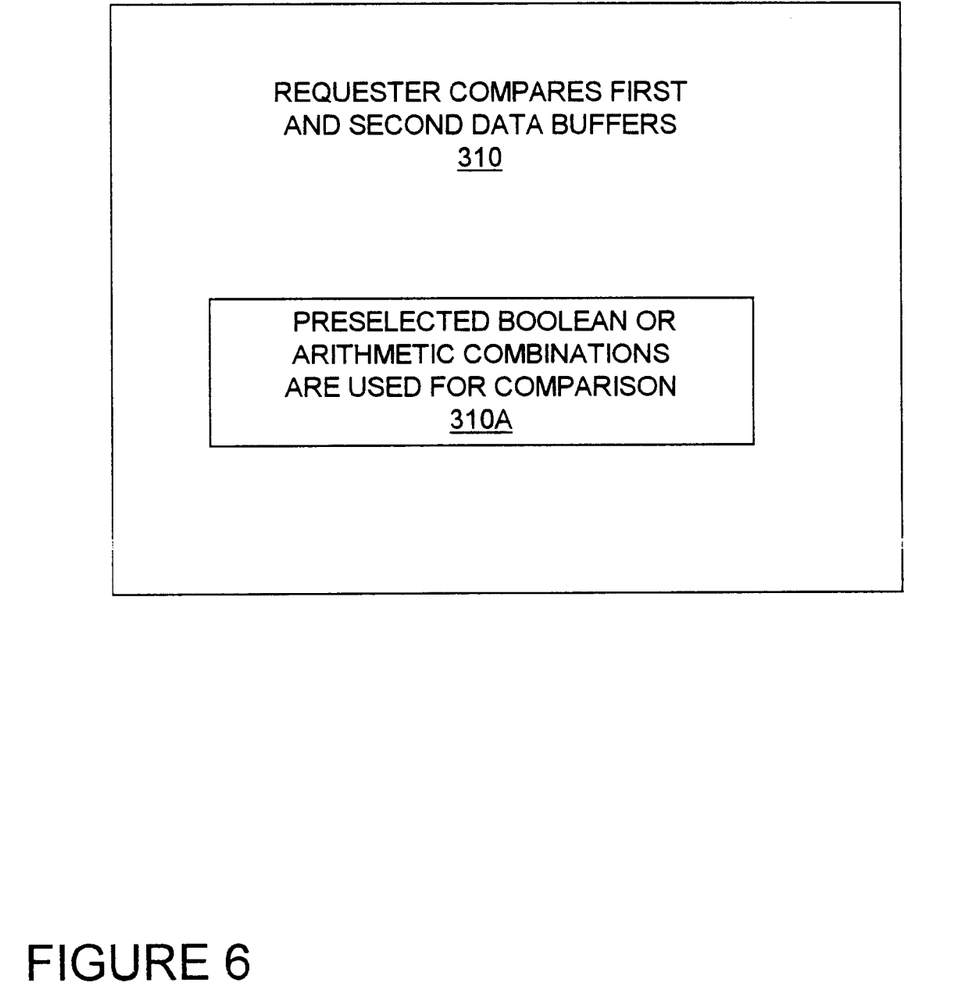
FIG. 6 illustrates substeps of a step of the method of FIG. 3.

The comparison of the first and second data sets is shown in greater detail in FIG. 6. As shown in FIG. 6, step 310, in which the requesting PTN compares the first and second data sets, includes a substep 310A, in which preselected Boolean or arithmetic functions are used to make the comparison.

Figure 7:
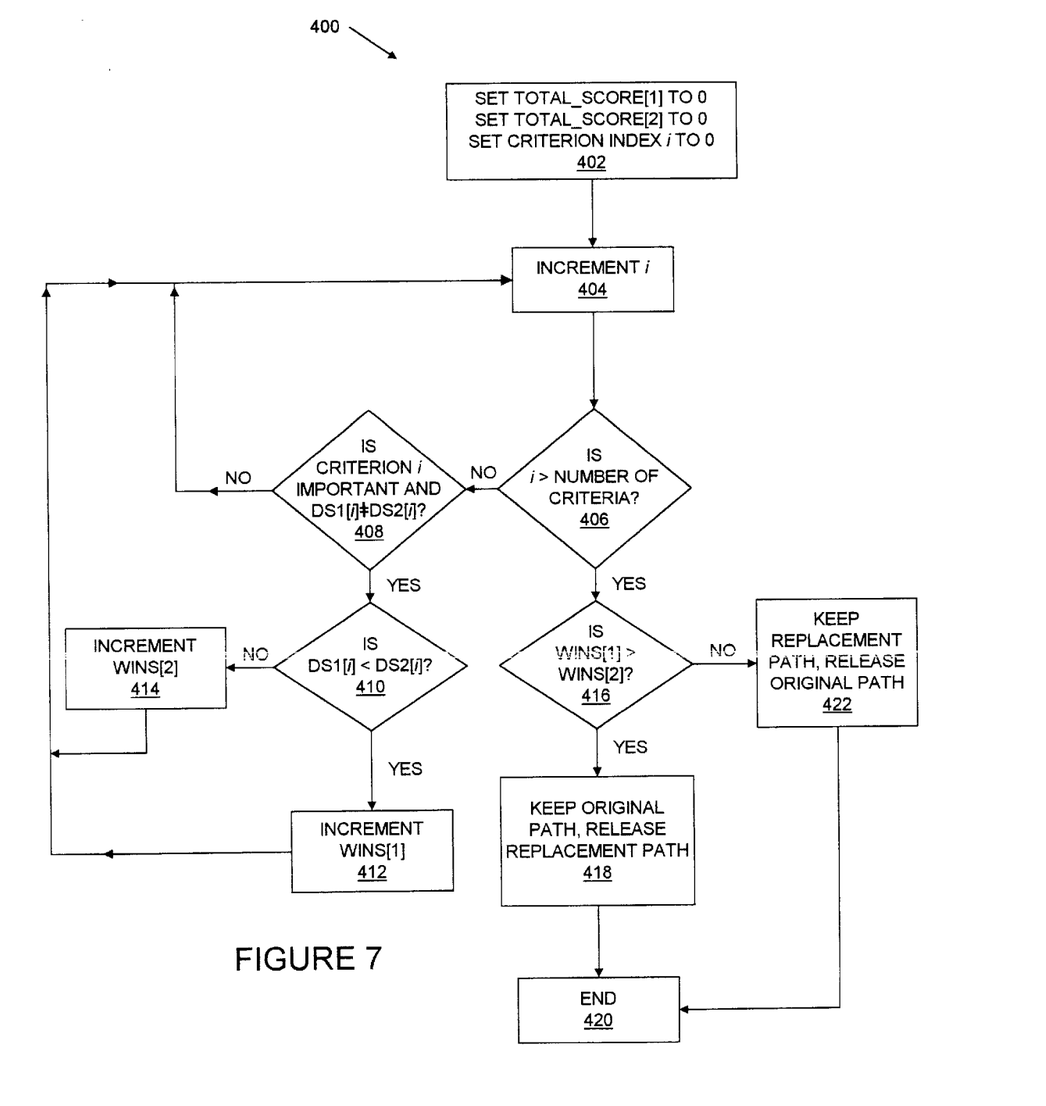
FIG. 7 is a flow chart illustrating steps of a method of comparing paths.

FIG. 7 is a flow chart illustrating a method 400 of path comparison in accordance with the present invention. In a step 402, a first data set and a second data set are initialized. The first data set corresponds to the original path, and the second data set corresponds to a potential replacement path. In a step 404, the criterion index i is incremented. At a step 406, it is determined whether the value of i is greater than the number of criteria (i.e., whether all criteria have been considered). If unconsidered criteria remain, a step 408 determines whether the instant ("ith") criterion has both been selected as important to the user, and whether the value of the ith criterion for the first data set does not equal the value of the ith criterion for the second data set. In the preferred embodiment, criteria are considered important by default, but the user can deselect them.

In one alternative embodiment, the user must select whether a criterion is important. In another alternative, criterion importance is not subject to user selection.

If it is determined at step 408 that fewer than both conditions (importance and nonequivalence) are met, the method returns to step 404, and the criterion index is incremented. If both conditions are met, it is determined whether the first data set or the second data set contains the preferable value for that criterion. In a preferred embodiment, a step 410 determines whether the value of criterion i in the first data set is less than the value of criterion i in the second data set. If yes, the method proceeds to a step 412, and the "win" tally of the first data set is incremented. If no, the "win" tally of data set 2 is incremented, at a step 414. After either step 412 or step 414, the method returns to step 404.

When all criteria have been considered, step 406 will determine that i is greater than the number of criteria, and the method will proceed to compare the number of wins in the first data set and the second data set. At a step 416, the method determines whether the number of wins in the first data set is greater than the number of wins in the second data set. If the answer is yes, the method proceeds to a step 418, which retains the original path and releases the potential replacement path. The method then ends, at a step 420.

Alternatively, if the number of wins in the first data set is not greater than the number of wins in the second data set, the method proceeds to a step 422, which switches to the replacement path and releases the original path. After step 422, the method ends.

Figure 8:
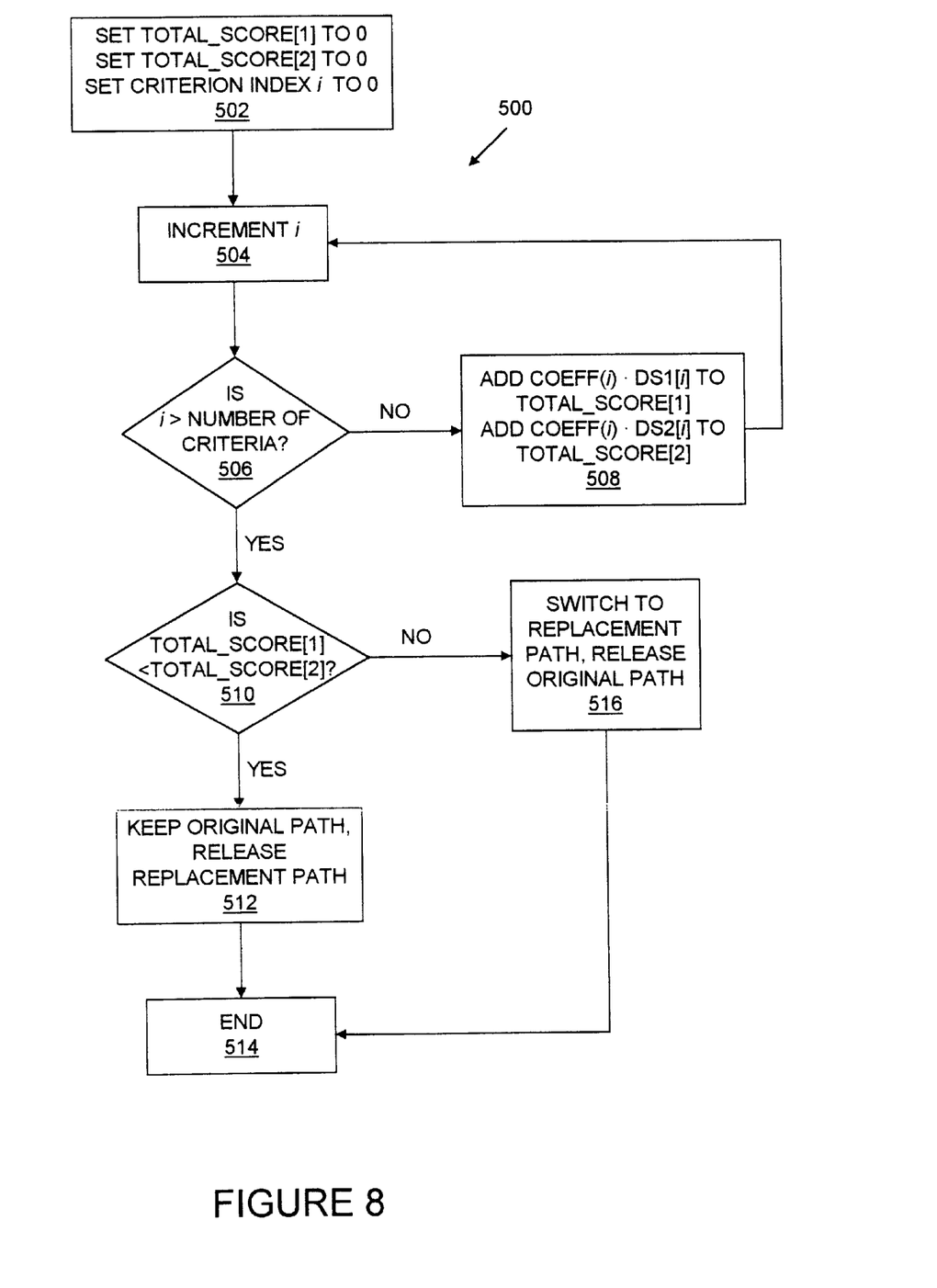
FIG. 8 is a flow chart illustrating steps of an alternative method of comparing paths.

An alternative method 500 for comparing path quality is illustrated in FIG. 8. In method 500, the criteria are weighted.

At a step 502, a first data set and a second data set are initialized. The first data set corresponds to the original path, and the second data set corresponds to a potential replacement path. In a step 504, the criterion index i is incremented. At a step 506, it is determined whether the value of i is greater than the number of criteria (i.e., whether all criteria have been considered). If unconsidered criteria remain, in a step 508 the product of a user-selected first coefficient times the value of criterion i for the first data set is added to the total score for the first data set; and the product of the same user-selected coefficient times the value of criterion i for the second data set is added to the total score for the second data set. The method then returns to step 504, where i is incremented, and proceeds to step 506.

If it is determined at step 506 that i is greater than the number of criteria, the method proceeds to a step 510 where the data paths are compared. At step 510, it is determined whether the total score for the first data path is less than the total score for data path 2. If yes, the original path is kept and the potential replacement path is released, at a step 512. The method then ends, at a step 514. If at step 510, the total score for the first data set is not less than the total score for the second data set, the method proceeds to a step 516, which switches to the replacement path and releases the original path. The method then ends at step 514.

The invention includes (but is not limited to) the following variations. Information used to update the data sets can be retrieved from a data base, measured, or detected. Information about current paths can be sent over the new path. If the desirability calculation results in the old and new paths being equivalent, either the old or new path can be retained. In alternative embodiments, cost of link and priority levels have a larger range of values.

In an alternative, the requesting PTN can send a request to the cooperating PTN that causes the cooperating PTN to initialize both a first and a second data set to collect information about the original path and the candidate replacement path, respectively.

The criteria used to determine path desirability can be other than those mentioned. In particular, any arithmetic or Boolean function (or combination of the two) can be the basis of a path comparison.

More than one replacement path can be sought at a time. The number of replacement paths is implementation independent. When more than one replacement path has been sought, the analysis has to take into consideration the additional comparison. Replacement requests can be user-driven, event-driven, administrator-driven, or system-driven. Intermediate PTNs can time stamp the data set to allow for direct calculation of system delay on a hop-by-hop basis. The system can be used with voice and non-voice applications.

The data and the data analysis results can be stored as raw traffic data for later statistical analysis and reporting. Examples might be how many times the replacement path is chosen over the original path, what the savings are in network resources, and monetary cost based on priority number.

Those skilled in the art will recognize that the foregoing description has been presented for the sake of illustration and description only. As such, it is not intended to be exhaustive or to limit the invention to the precise form disclosed. Modifications and variations are possible in light of the above teaching that are considered to be within the spirit of the present invention, the scope of which is limited only by the following claims.

What is claimed is:

1. An apparatus for determining a better path through an integrated services digital network (ISDN), comprising:
   a requesting telephone network including a first initializing processor for initializing a first data set including information about a first functioning path;
   a first set of intermediate telephone networks, each intermediate telephone network in said first set including a respective updating processor for updating said first data set;
   a cooperating telephone network including a second initializing processor for initializing a second data set including information about a second functioning path;
   a second set of intermediate telephone networks, each intermediate telephone network in said second set including a respective updating processor for updating said second data set; and
   a comparison processor for comparing the first data set with the second data set to determine a preferred path based on the comparison.

2. An apparatus as in claim 1 wherein a single processor comprises both said first initializing processor for initializing said first data set and said comparison processor for comparing the first data set with the second data set.

3. An apparatus as in claim 1 further including means for selecting the preferred path.

4. An apparatus as in claim 1 further including means for releasing the other path.

5. A method for determining a preferred path through an integrated services digital network (ISDN), comprising the following steps:
   establishing path comparison criteria;
   requesting a path comparison for an functioning path;
   initializing a first data set about the functioning path;
   filling the first data set with information about the links of the functioning path;
   initializing a second data set about a potential replacement path;
   filling the second data set with information about the links of the potential replacement path;
   comparing the first data set with the second data set according to said criteria;
   selecting exactly one of the functioning path and the replacement path according to said comparison; and
   releasing the other path.

6. A method for determining a replacement path through an ISDN network, comprising the following steps:
   (a) requesting, by a requesting telephone network, a replacement path;
   (b) gathering a first data set including information on links of a currently functioning path;
   (c) establishing, by a cooperating telephone network, a candidate replacement path;
   (d) gathering a second data set including information on links of the candidate replacement path;
   (e) comparing said first and second data sets according to preselected criteria, said preselected criteria providing a basis for determining a better path and a worse path; and
   (f) releasing said worse path and retaining said better path.

7. A method as in claim 6, wherein step (b) further comprises the substeps:
   (b.1) initializing, by said requesting telephone network, a first data set;
   (b.2) updating, by each telephone network on the currently functioning path intermediate between the requesting telephone network and the cooperating telephone network, the first data set with its routing information; and
   (b.3) updating, by the cooperating telephone network, the first data set with its routing information.

8. A method as in claim 6, wherein step (d) further comprises the substeps:
   (d.1) initializing, by said cooperating telephone network, a second data set;
   (d.2) updating, by each telephone network on the candidate replacement path intermediate between the cooperating telephone network and the requesting telephone network, the second data set with its routing information; and
   (d.3) updating, by the requesting telephone network, the second data set with its routing information.

9. A method as in claim 6, wherein step (e) further comprises the substep:
   (e.1) comparing, by the requesting telephone network, the first and the second data sets according to a preselected arithmetic function.

10. A method as in claim 9, wherein the arithmetic function of step (e.1) is the sum of the value of each criterion times a preselected coefficient for each criterion, and wherein the preferred path corresponds to the smaller sum.

11. A method as in claim 6, wherein step (e) further comprises the substep:
   (e.1) comparing, by the requesting telephone network, the first and the second data sets according to a preselected Boolean function.

12. A method as in claim 11, wherein the Boolean function of step (e.1) selects the preferred path according to which is preferable according to more of the criteria.

13. A method as in claim 11, wherein the Boolean function of step (e.1) selects the preferred path according to which is preferable according to administrative preselection by priority.

14. A method as in claim 6, in which the criteria include total link cost, B-channel delay, number of gateway telephone networks, and trunk priority.

15. A method as in claim 14 in which the B-channel delay is derived from information about the D-channel delay.

* * * * *